No. 891,586.
PATENTED JUNE 23, 1908.
T. BADEN.
CRANK MECHANISM.
APPLICATION FILED DEC. 17, 1906.
2 SHEETS—SHEET 1.
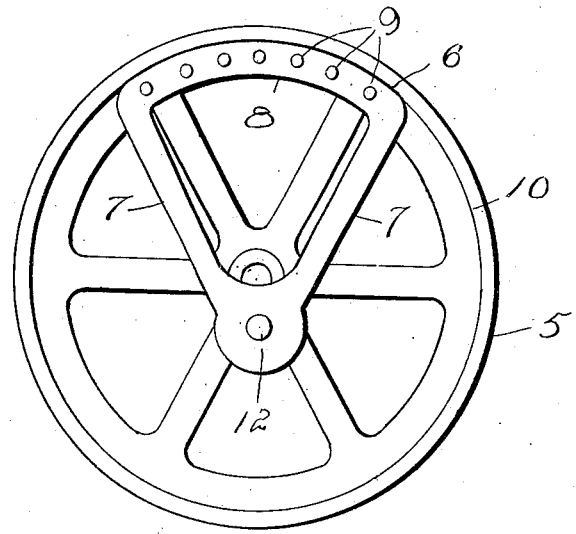
Fig. I.
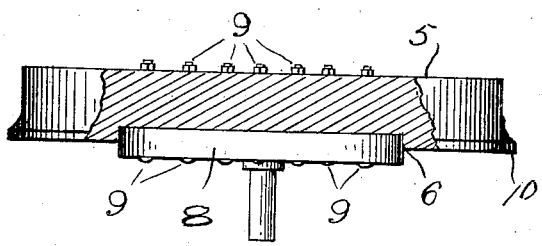
Fig. 2.
Witnesses
J. C. Simpson
James W. Quinn
Inventor
Theodore Baden.
By Candle & Candle
Attorneys No. 891,586. PATENTED JUNE 23, 1908.
T. BADEN.
CRANK MECHANISM.
APPLICATION FILED DEC. 17, 1906.

2 SHEETS—SHEET 2.

Witnesses
J. C. Simpson
James W. Zimm

Inventor
Theodore Baden
By Chandlee & Chandlee
Attorneys

UNITED STATES PATENT OFFICE.

THEODORE BADEN, OF HACKENSACK, NEW JERSEY.

CRANK MECHANISM.

No. 891,586.　　　Specification of Letters Patent.　　　Patented June 23, 1908.

Application filed December 17, 1906. Serial No. 348,230.

*To all whom it may concern:*

Be it known that I, THEODORE BADEN, a citizen of the United States, residing at Hackensack, in the county of Bergen, State of New Jersey, have invented certain new and useful Improvements in Crank Mechanism; and I do hereby declare the following to be a full, clear, and exact description of the invention, such as will enable others skilled in the art to which it appertains to make and use the same.

This invention relates to crank mechanisms, and more particularly to that class designed for use in connection with the drive wheels of a locomotive, and the primary object of the invention is to lessen the length of stroke of the engine pistons and thereby save considerable steam which is at present needlessly wasted. In carrying out this object, the member, which is in the form of a sector is provided and is bolted or otherwise secured to the drive wheel and it is provided at the point of intersection of its radial arms with a crank pin. From this it will be understood that the connecting rod and the piston of the engine have a shorter stroke due to the fact that the crank pin is located only a short distance from the end of the axle. In addition to this the arms of the sector-shaped member and also the arc portion thereof serve very efficiently as a counterbalance for the wheel, being located at the opposite side of the axis to the crank pin.

Figure 3:
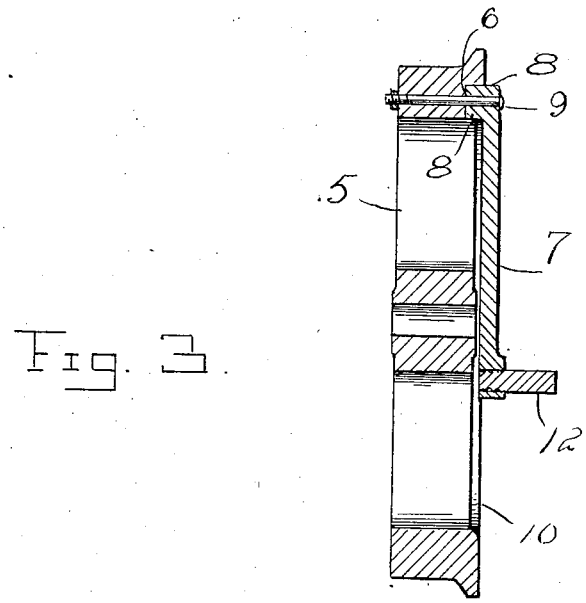
Figure 4:
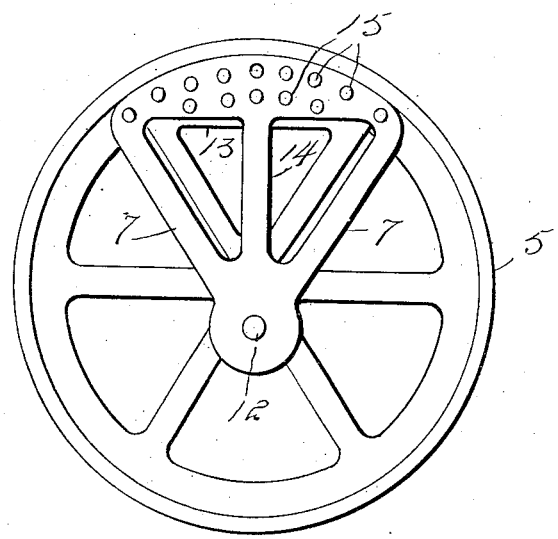

In the accompanying drawings: Figure 1 is a side elevation of an engine drive wheel showing my crank mechanism connected therewith. Fig. 2 is a plan view of the wheel, a portion of the periphery of the wheel being broken away. Fig. 3 is a detail vertical sectional view through the wheel, and, Fig. 4 is a view similar to Fig. 1 showing the application of the device to a drive wheel having a counterbalancing portion.

Referring more specifically to the drawings, the numeral 5 denotes an engine drive wheel and 6 a recess which is formed in one side of its rim.

The crank mechanism embodying my invention comprises a sector-shaped member including radial arms 7 and an arcuate connecting portion 8 that connects the outer ends of the arms 7 and is seated in the recess 6, the recess being, however, of less depth than the thickness of the said portion 8. The connecting portion 8 serves as a means for securing the crank mechanism upon the wheel and through the said portion and the recessed portion of the rim of the wheel are engaged bolts 9, the outer edge of the arcuate connecting member 8 being in contact with the flange of the wheel, which flange is indicated by the numeral 10.

Formed upon the sector-shaped member at the point of junction of its radial arm 7 is a crank pin 12 with which a connecting rod (not shown) is connected.

In the form of my invention as shown in Fig. 4, the drive wheel is shown as being provided with a counterbalancing web portion 13 and a third or intermediate arm 14 is provided upon the sector-shaped member, there being preferably several bolts 15 engaged through this arm and through the web portion 13 in addition to the bolts which are engaged through the arcuate connecting portion of the member and the rim of the drive wheel.

What is claimed is:—

In a device of the class described, the combination with a wheel provided in one side of its rim with a recess, of a sector-shaped counterbalancing member secured at its curved outer edge in said recess, the apex of said member being extended diametrically past the axis of said wheel, and a crank pin formed upon said counterbalancing member at its apex.

In testimony whereof, I affix my signature, in presence of two witnesses.

THEODORE BADEN.

Witnesses:
　ABRAHAM S. D. DEMAREST,
　ROBT. CONKLIN.